(12) United States Patent
Nieto et al.

(10) Patent No.: US 12,113,379 B2
(45) Date of Patent: Oct. 8, 2024

(54) MACHINE LEARNING-BASED METHOD FOR INCREASING LIFETIME OF A BATTERY ENERGY STORAGE SYSTEM

(71) Applicant: ABB Schweiz AG, Baden (CH)

(72) Inventors: Carlos Nieto, Rae Vald (EE); Kacper Sowa, Malopolska (PL); Piotr Oramus, Cracow (PL); Hemangi Borole, Rae Vald (EE); Tomasz Kuczek, Cracow (PL)

(73) Assignee: ABB Schweiz AG, Baden (CH)

( * ) Notice: Subject to any disclaimer, the term of this patent is extended or adjusted under 35 U.S.C. 154(b) by 448 days.

(21) Appl. No.: 17/452,340

(22) Filed: Oct. 26, 2021

(65) Prior Publication Data

US 2022/0140625 A1 May 5, 2022

(30) Foreign Application Priority Data

Oct. 30, 2020 (EP) .................................... 20204897

(51) Int. Cl.
*H02J 7/00* (2006.01)
*G06N 3/045* (2023.01)
(Continued)

(52) U.S. Cl.
CPC .......... *H02J 7/00036* (2020.01); *G06N 3/045* (2023.01); *G06N 3/047* (2023.01); *G06N 3/088* (2013.01); *G06N 20/00* (2019.01)

(58) Field of Classification Search
CPC .... H02J 7/00036; H02J 2203/20; H02J 3/322; H02J 7/0071; H02J 2300/24; H02J 3/38;
(Continued)

(56) References Cited

U.S. PATENT DOCUMENTS 10,305,309 B2 * 5/2019 Baumgartner ........ H02J 7/0047
10,634,725 B2 * 4/2020 Asghari ..................... H02J 7/00
(Continued)

FOREIGN PATENT DOCUMENTS

GB       2609557 A  *  2/2023  .......... G05B 13/041

OTHER PUBLICATIONS

Extended European Search Report; Application No. 20204897.1; Completed: Mar. 22, 2021; Issued: Mar. 30, 2021; 9 Pages.

*Primary Examiner* — M Baye Diao
(74) *Attorney, Agent, or Firm* — Whitmyer IP Group LLC

(57) ABSTRACT

An apparatus for performing the following: the apparatus maintains, in a database, one or more trained machine learning algorithms for predicting an optimal charging strategy for a time interval based on one or more values of a set of prediction parameters relating to a point of common coupling and one or more electrical load devices and on a state of charge level of the battery energy storage system. The apparatus obtains one or more recent values of the set of prediction parameters relating to one or more previous time intervals and predicts, using the one or more trained machine learning algorithm, an optimal charging strategy for a next time interval based on the one or more recent values and a current state of charge level of the battery energy storage system. Finally, the apparatus operates the battery energy storage system using the predicted optimal charging strategy.

22 Claims, 6 Drawing Sheets

(51) Int. Cl.
*G06N 3/047* (2023.01)
*G06N 3/088* (2023.01)
*G06N 20/00* (2019.01)

(58) Field of Classification Search
CPC ........ G06N 3/045; G06N 3/047; G06N 3/088;
G06N 20/00; Y02E 60/00; Y02E 10/56;
Y02E 40/10; Y04S 40/20
USPC ........................................................ 320/108
See application file for complete search history.

(56) References Cited

U.S. PATENT DOCUMENTS

| | | | |
|---|---|---|---|
| 10,680,455 B2 * | 6/2020 | Hooshmand | G06Q 50/06 |
| 11,699,909 B1 * | 7/2023 | Kahn | H02J 7/0013 |
| | | | 320/126 |
| 2016/0183695 A1 * | 6/2016 | Veron | G08B 21/0205 |
| | | | 5/93.1 |
| 2019/0056451 A1 | 2/2019 | Asghari et al. | |
| 2019/0148945 A1 | 5/2019 | Nakayama et al. | |
| 2022/0108184 A1 * | 4/2022 | Neumann | G06N 3/045 |

* cited by examiner

MACHINE LEARNING-BASED METHOD FOR INCREASING LIFETIME OF A BATTERY ENERGY STORAGE SYSTEM

TECHNICAL FIELD

Various example embodiments relate to battery energy management.

BACKGROUND

Ratings of electric vehicle chargers (EVCs) are constantly increasing and thus their impact on the quality of the electrical grid is also increasing. During high loads, permitted voltage drop limits can be exceeded, especially in grids characterized with low short circuit power (so called weak grids). While a battery energy storage system (BESS) may be used to increase the power output from the electrical grid connected to the electric vehicle charging station, it also increases the complexity of the system. Moreover, the complexity is further increased due to the unpredictability of charging of electric vehicles. Namely, the load profiles of electric vehicles are not known in advance and thus an optimal capacity for the system as well as the parameters of operations are often hard to be set up. The status and lifetime of the electrical storage in the charging station depends on the loading cycles provided to support the charging of electric vehicles. Therefore, there is a need for a solution for optimizing the operation of a battery energy storage system, especially when used in connection with electric vehicle chargers.

SUMMARY

According to an aspect, there is provided the subject matter of the independent claims. Embodiments are defined in the dependent claims. The scope of protection sought for various embodiments of the invention is set out by the independent claims.

The embodiments and features, if any, described in this specification that do not fall under the scope of the independent claims are to be interpreted as examples useful for understanding various embodiments of the invention.

BRIEF DESCRIPTION OF THE DRAWINGS

In the following, example embodiments will be described in greater detail with reference to the attached drawings, in which.

DETAILED DESCRIPTION

Figure 1:
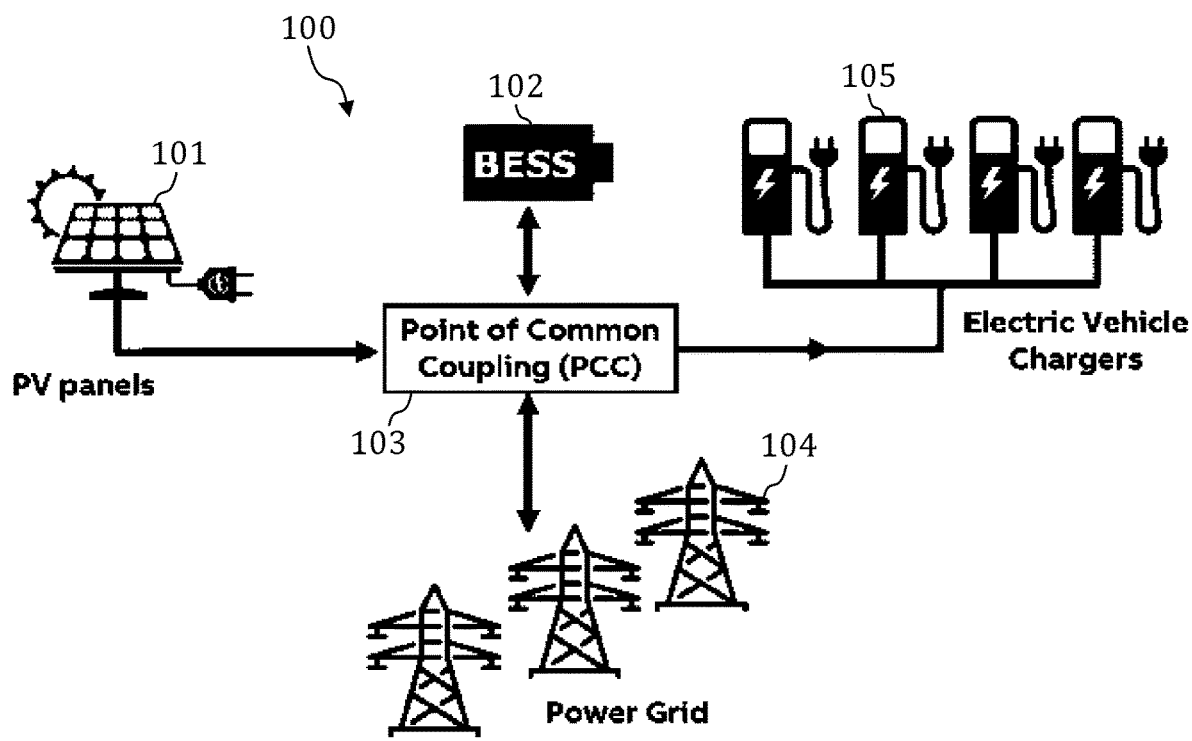
FIG. 1 illustrates an exemplified system.

FIG. 1 depicts an example of simplified system architecture only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other systems for delivering electricity provided with necessary properties.

The example of FIG. 1 shows a part of an exemplifying microgrid (or an electric power supply network). The illustrated system 100 comprises one or more photovoltaic (PV) systems 101, a battery energy storage system (BESS) 102, an electrical grid 104 (also called a power grid) and one or more electric vehicle chargers (EVCs) 105. The one or more PV arrays 101 may be considered optional.

The BESS 102 and the one or more electric vehicle chargers 105 drawing power from the electrical grid 104 are connected to the electrical grid 104 and/or the one or more photovoltaic (PV) systems 101 via a point of common coupling (PCC) 103. A PCC 103 may be defined, in general, as a point of a power supply network (e.g., the electrical grid 104), electrically nearest to a particular load (e.g., the BESS 102), at which other loads (e.g., the one or more EVCs 105) are, or may be, connected. The electrical grid 104 may, in some embodiments, correspond to a public electrical grid.

The one or more photovoltaic (PV) systems 101 are power systems for supplying usable solar power by means of photovoltaics. They may comprise, for example, one or more PV arrays for absorbing and converting sunlight into electricity, a solar inverter for converting the output from direct to alternating current, and/or as mounting, cabling, and/or other electrical accessories needed for setting up a working PV system. The one or more photovoltaic (PV) systems 101 may be specifically configured to provide electric power at least to the BESS 102 and/or the one or more electric vehicle chargers 105 via the PCC 103. The one or more PV systems 101 may be considered optional in view of the embodiments to be discussed below. In some embodiments, the one or more PV systems 101 may form a part of the electrical grid 104.

Battery energy storage systems (BESSs) are, in general, rechargeable battery systems which store energy from PV arrays and/or the electrical grid and provide that energy to a home or business. In particular, the BESS 102 in FIG. 1 may draw energy from the electrical grid 104 and/or from the one or more PV arrays 101 for charging itself. The BESS 102 may comprise a built-in inverter and/or at least one computerized control system (i.e., at least one computing device) for performing advanced functions such as peak shaving and load shifting/levelling.

The main purpose of the BESS 102 in the system 100 is to support the operation of the one or more electric vehicle chargers 105, especially when the demand of charging power exceeds maximum limit of the electrical grid 104 and/or the one or more PV systems 101 leading to peak shaving. In such case, the BESS 103 provides support for the operation of the electrical grid 104. On the other hand, when no vehicles are being charged using the one or more electric vehicle chargers 105, the BESS 102 may start charging itself. This basic control strategy does not, however, take into account the lifespan of at least one battery installed in the BESS 102.

The BESS 102 may specifically store energy using one or more electro-chemical solutions. Said one or more electro-chemical solutions may employ at least one battery of any of the following types: lithium-ion, lead-acid, sodium sulfur, zinc bromine and flow.

In some embodiments, the at least one of the BESS 102 may be specifically lithium-ion (Li-Ion) batteries. While Li-Ion batteries offer good energy storage for their size, they have a relatively limited lifetime which is non-fixed and related not only to battery chemistry and specifications but also to operation and storage conditions. The embodiments to be discussed below in detail may be specifically employed to optimize utilization of the at least one Li-Ion battery in the BESS 102 so as to extend the lifespan of the at least one battery of the BESS 102.

In some embodiments, the BESS 102 itself and/or an apparatus for managing the BESS 102 may be connected via a communication network or link to the one or more PV systems 101, to the point of common coupling 103 (or specifically a grid connection interface device therein) and/or to the one or more electric vehicle chargers 105 for collecting information from said devices.

The one or more electric vehicle chargers (EVCs) 105 are configured to draw electric power from the BESS 102 and/or directly from the electrical grid 104 and/or from one or more PV systems 101 and use said electric power for charging electric vehicles. Each electric vehicle charger 105 may form a part of an electric vehicle charging station. Any type of electric vehicle charger may be employed in connection with embodiments. In some embodiments, at least one of the one or more electric vehicle chargers 105 may be replaced with other electrical load devices (i.e., devices which act as an electrical load for an electric power supply network).

The one or more electric vehicle chargers 105 (and electric vehicle chargers in general) are highly unpredictable loads, characterized by random arrivals of electric vehicles to the electric vehicle charging stations and intermittent operation. The problem of unpredictable loads is exacerbated, e.g., by the fact that car batteries of different manufactures have different charging properties, the fact that state of charge (SoC) level of a given car battery to be charged is not known ahead of time, problems with communications which may cause the charging to stop and/or power sharing between electric vehicle chargers. As a consequence, an optimal capacity for the BESS 102 as well as the parameters of operations are often hard to be set up. The status and lifetime of the electrical storage in the charging station depends on the loading cycles provided to support the charging of electric vehicles.

The embodiments provide machine learning-based solutions for predicting site behaviors and optimal selection of BESS operation intervals (i.e., at least selection of appropriate charging windows) in accordance with recommendations provided by the battery manufacturer. Machine learning has the benefit of not necessarily requiring one to know the (often very complex) model of the underlying phenomena.

The embodiments to be discussed below may be based on a plurality of different machine learning algorithms or techniques. In the following, a few non-limiting examples of machine learning algorithms which may be employed in embodiments are described.

The embodiments may specifically employ supervised machine learning methods, that is, machine learning methods where an input-target pair is provided for training. Any time series prediction problem can be transformed into supervised machine learning by shifting the labels (i.e., the discrete values of the outcome variable to be predicted) by some time $t_0$:

$$y_{t+t_0} = f(X_t).$$

In the above equation, one can see that given some input features $X_t$ and a function $f$, we can predict $y_{t+t_0}$ if we shift the outputs labels by time $t_0$. Consequently, a typical time series prediction problem may be treated as supervised machine learning.

Different supervised machine learning methods may be employed used in embodiments. These different supervised machine learning methods may comprise, for example, support vector machines (SVMs), regression analysis (e.g., linear, logical or lasso regression), multiagent learning, naive Bayes, linear discriminant analysis, (random) decision tree-based learning, k-nearest neighbor algorithm, artificial neural networks (e.g., multilayer perceptron networks), similarity learning, statistical classification and/or boosting algorithm (e.g., xgboost).

In some embodiments, reinforcement learning may be employed in embodiments instead of (or in addition) to supervised learning). Reinforcement learning differs from supervised learning in not needing labelled input/output pairs be presented, and in not needing sub-optimal actions to be explicitly corrected. Instead, the focus is on finding a balance between exploration (of uncharted territory) and exploitation (of current knowledge).

The embodiments may, for example, employ one or more neural networks for the machine learning. Neural networks (or specifically artificial neural networks) are computing systems comprised of highly interconnected "neurons" capable of information processing due to their dynamic state response to external inputs. In other words, an artificial neural network is an interconnected group of nodes (or "neurons"), where each connection between nodes is associated with a weight (i.e., a weighting factor) a value of which affects the strength of the signal at said connection and thus also the total output of the neural network. Sometimes, a bias term is also added to a total weighted sum of inputs at a node. Training of a neural network typically involves adjusting said weights (and possibly biases) so as to match a known output given a certain known input.

The one or more neural networks employed in embodiments may comprise one or more feedforward neural networks (e.g., a multilayer perceptron model) and/or one or more recurrent neural networks. Feedforward neural networks do not have the capability to store any information since there are no loops in feedforward neural networks. Recurrent neural networks (RNNs), on the other hand, have loops in them allowing information to be maintained. One example of a recurrent neural network which may be employed in embodiments is a long short term memory (LSTM) which is a special type of recurrent neural network specialized in learning long-term dependencies.

Figure 2:
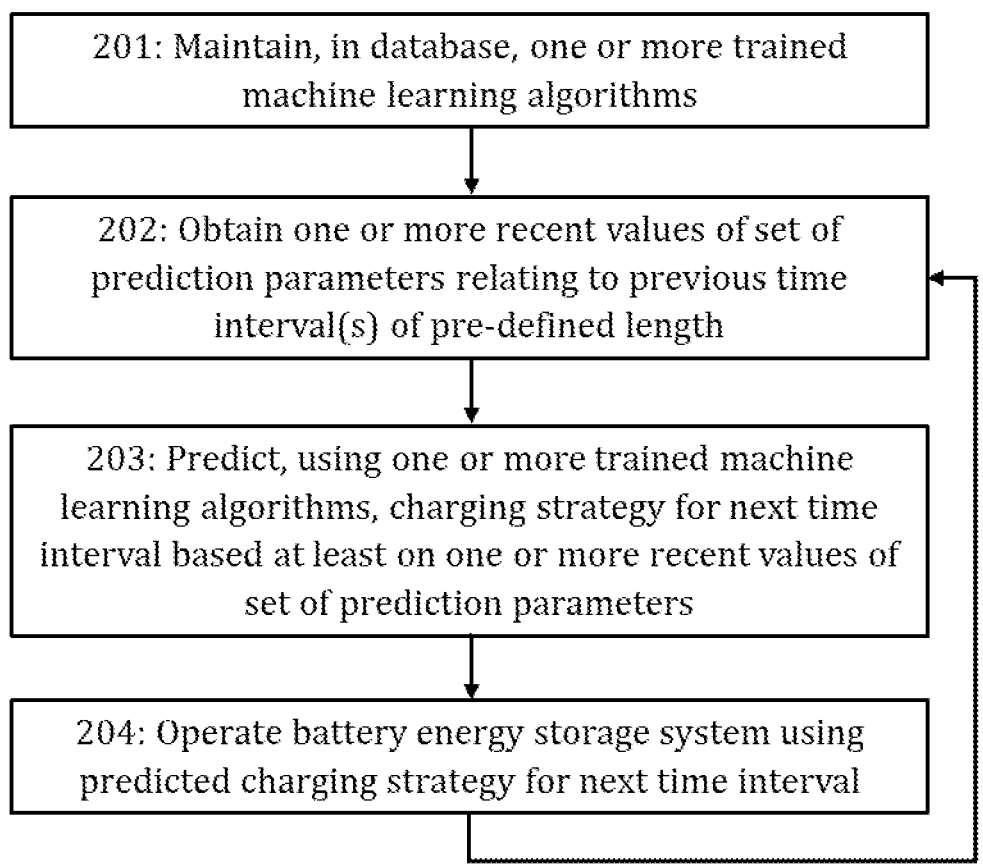
FIGS. 2 to 5 illustrate exemplary processes according to embodiments.

FIG. 2 illustrates a process according to embodiments for predicting an optimal charging strategy for a battery energy storage system and operating the BESS according to the predicted optimal charging strategy. The illustrated process may be performed by the BESS itself or an apparatus (e.g., a computing device) for managing the BESS and being comprised in or electrically connected to the BESS. Specifically, the apparatus carrying out the process may be the BESS 102 of FIG. 1 or an apparatus electrically connected thereto or comprised therein. It is assumed that, similar to as illustrated in FIG. 1, the battery energy storage system is configured to store energy supplied via a point of common coupling of an electric power supply network (or an electrical grid) for use by one or more electrical load devices (e.g., one or more electric vehicle chargers). The electric power may be supplied at least via an electrical grid (e.g., a weak grid) and optionally also by one or more photovoltaic systems. In the following, the apparatus carrying out the process is called simply a first apparatus for brevity.

Referring to FIG. 2, it is initially assumed in block 201 that the first apparatus maintains, in a first database, one or more trained machine learning algorithms for predicting an optimal charging strategy for a time interval of a pre-defined length based at least on one or more values of (each of) a set of prediction parameters and a (current) state of charge level of at least one battery of the battery energy storage system. The set of prediction parameters may comprise at least one or more first parameters of the point of common coupling and one or more second parameters of the one or more electrical load devices. The optimal charging strategy may specifically be optimal in terms of maximizing lifetime of the at least one battery of the BESS. The time interval may be equally called a time window. In some embodiments, the first database may be a cloud-based database.

In some embodiments, said pre-defined length of the time interval may correspond to a length selected from the range of 1 hour to 1 week, preferably 1-48 hours, more preferably 12-48 hours. In some embodiments, the pre-defined length of the time interval may be specifically 24 hours (i.e., a day), preferably defined from midnight to midnight.

The one or more trained machine learning algorithms may have been trained, for example, during the deployment of the first apparatus and/or of the BESS based on a large training data set comprising, e.g., historical values of the set of prediction parameters and corresponding state of charge, power supply and charging information and/or optimal charging strategy based thereon. The generation and initial training of the one or more trained machine learning algorithms is discussed in more detail in connection with FIG. 5 while subsequent (online) training during the operation of the BESS is discussed in connection with FIG. 4.

In some embodiments, the one or more trained machine learning algorithms may comprise at least two trained machine learning algorithms which are executed subsequently so that the output of a first trained machine learning algorithm (or a part thereof) is used as an input of a second trained machine learning algorithm. The one or more trained machine learning algorithms may specifically comprise a first trained machine learning algorithm for predicting an expected load profile at the point of common coupling for the time interval of the pre-defined length based on the one or more values of the set of prediction parameters and a second trained machine learning algorithm for predicting the optimal charging strategy based on the expected load profile and a state of charge level of said at least one battery of the battery energy storage system, as will be described in more detail in connection with FIG. 3.

The expected load profile may be defined, here and in the following, as the expected load profile (at the point of common coupling) which needs to be covered by the battery energy storage system. In other words, the expected load profile may correspond to an expected total load profile from which power to be supplied by the electric power supply network (and optionally by one or more PV systems) has been subtracted (assuming also that the battery energy storage system cause no load at the point of common coupling). In other embodiments, the expected load profile may be defined explicitly to comprise the expected total load profile (not taking into account any possible load caused by the battery energy storage system) and the expected power supplied by the electric power supply network (and optionally by one or more PV systems).

The one or more values of the set of prediction parameters and a state of charge level of said at least one battery of the battery energy storage system correspond to (input) features of the one or more trained machine learning algorithms (or specifically of first and second trained machine learning algorithms, respectively). The one or more values of the set of prediction parameters (which the one or more trained machine learning algorithms may correspond, for each of the set of parameters, to a single value characterizing the previous time interval of the pre-defined length or to a plurality of values defining a time series over the previous time interval of the pre-defined length. In some embodiments, the one or more values of the set of prediction parameters may correspond, for at least one of the set of parameters, to a plurality of values defining a time series over the previous time interval of the pre-defined length.

The state of charge level of said at least one battery of the battery energy storage system may correspond to a single value indicating the current (i.e., most recent) state of charge level of said at least one battery of the battery energy storage system. This current state of charge level serves as a starting point for the operation during the next pre-defined time interval. In some embodiments, a plurality of (most recent) values of the state of charge level may be provided and used in the prediction using the one or more trained machine learning algorithms, instead of a single value.

In some embodiments, the one or more trained machine learning algorithms (or specifically the first trained machine learning algorithm) may be configured to take as input, in addition one or more values of the set of parameters relating to a previous time interval of the predefined length, one or more past values of at least one of the set of prediction parameters relating to one or more time intervals of the pre-defined length preceding the aforementioned previous time interval. Also in this case, the one or more past values may correspond, for each of the set of parameters, to a single value characterizing the time interval or to a plurality of values defining a time series over the time interval.

As mentioned above, the set of prediction parameters may comprise one or more first parameters of the point of common coupling. The one or more first parameters of the point of common coupling may be specifically electrical parameters of the point of common coupling. In some embodiments, the one or more first parameters of the point of common coupling may comprise one or more (electrical) parameters associated with power transfer to the battery energy storage system and/or to the one or more electrical load devices selected from a group comprising: voltage, current, frequency, power, active power, reactive power, maximum available power, peak power and energy. In other words, the one or more first parameters of the point of common coupling may provide information on power delivered to the one or more electrical load devices or to the battery energy storage system or to both of them. Any of the listed parameters may be specifically measured at the point of common coupling. Additionally or alternatively, the one or more first parameters of the point of common coupling may comprise an average, median or sum of any of the listed parameters calculated over the previous time interval of the pre-defined length (or over a plurality of previous time intervals of the pre-defined length). As described above, the one or more trained machine learning algorithms or specifically the first trained machine learning algorithm may take as input, for each of the one or more first parameters, a single value characterizing the previous time interval of the pre-defined length or a plurality of values defining a time series over the previous time interval of the pre-defined length.

As mentioned above, the set of prediction parameters may comprise one or more second parameters of the one or more electrical load devices. The one or more second parameters of the one or more electrical load devices may be specifically parameters quantifying, directly or indirectly, the electrical load caused by the one or more electrical load devices over the time interval of the pre-defined length. In some embodiments, the one or more second parameters of the one or more electrical load devices comprise, for each of the one or more electrical load devices, one or more parameters selected from a group comprising: load demand, a parameter (or parameters) defining one or more most common charging profiles, nominal power and efficiency. In some embodiments, at least the load demand may be selected. Additionally or alternatively, the one or more second parameters of the one or more electrical load devices may comprise an average, median or sum of any of the listed parameters calculated over the previous time interval of the pre-defined length (or over a plurality of previous time intervals of the pre-defined length). As described above, the one or more trained machine learning algorithms or specifically the first trained machine learning algorithm may take as input, for each of the one or more second parameters, a single value characterizing the previous time interval of the pre-defined length or a plurality of values defining a time series over the previous time interval of the pre-defined length. For example, the load demand of an electrical load device may be given as a time series over the previous time interval of the pre-defined length, that is, as a charging profile of the electrical load device. The load demand may be equally called car charging characteristics if the electrical load device corresponds to an electric vehicle charger.

In some embodiments where the one or more electrical load devices are specifically electric vehicle chargers, the set of parameters may comprise one or more of the following:
- a type or model of a car charged by an electric vehicle charger (or a distribution thereof covering a time interval of the pre-defined length),
- an initial and final state of charge level of a car charged by an electric vehicle charger (or distributions thereof covering a time interval of the pre-defined length),
- energy transferred to cars, by the one or more electric vehicle chargers, over a time interval of the pre-defined length,
- charging power (i.e., load demand) of the one or more electric vehicle chargers over the time interval of the pre-defined length,
- power profile measured at the point of common coupling for the time interval of the pre-defined length,
- energy transferred to the BESS over the time interval of the pre-defined length and
- energy transferred from the BESS over the time interval of the pre-defined length.

In such embodiments, the pre-defined length of the time interval may be specifically 24 hours.

In some embodiments, the set of prediction parameters may further comprise one or more third parameters of the one or more photovoltaic systems. The one or more photovoltaic systems may be photovoltaic systems as discussed in connection with element 101 of FIG. 1. The one or more third parameters of the one or more photovoltaic systems may comprise, for each of the one or more photovoltaic systems, one or more parameters selected from a group comprising: maximum available power and past or expected future energy generation (during a time interval of the pre-defined length). The expected future energy generation may have been calculated by the first apparatus (or some other apparatus) based on past energy generation over one or more past time intervals of the pre-defined length (i.e., based on historical data).

The first apparatus obtains, in block 202, one or more recent values of the set of prediction parameters relating to one or more previous (or prior) time intervals of the pre-defined length. The one or more recent values of the set of prediction parameters may be defined as described above in connection with block 201 for the one or more values of the set of prediction parameters which the one or more trained machine learning algorithms take as input (though obviously, in this case, the values relate specifically to said one or more previous time intervals of the pre-defined length).

Said one or more previous time intervals of the pre-defined length may refer to a single time interval or multiple time intervals directly preceding said next time interval (i.e., the time interval of the pre-defined length which will pass next) and/or to time interval or multiple time intervals preceding the next time interval but separated from it by at least one time interval. For example, assuming that the pre-defined length for the time intervals is 24 hours, said one or more previous time intervals of the pre-defined length may correspond to yesterday or to a day seven days from now (i.e., the same day of the week from last week).

The obtaining may comprise, here, measuring (or causing measuring) and/or receiving one or more values of the one or more first parameters of the point of common coupling, causing measuring and/or receiving one or more values of the one or more second parameters of the one or more electrical load devices and/or causing measuring and/or receiving one or more values of the one or more third parameters of the one or more PV systems. In other words, at least some (or even all) of the one or more recent values of the set of prediction parameters may be derived through online measurements of the point of common coupling, the one or more electrical load devices and/or one or more photovoltaic systems.

The first apparatus predicts in block 203, using the one or more trained machine learning algorithm, an optimal charging strategy for a next time interval of the pre-defined length based at least on the one or more recent values of the set of prediction parameters and a current state of charge level of said at least one battery of the battery energy storage system. The optimal charging strategy may be specifically optimal in view of maximizing lifespan of said at least one battery of the battery energy storage system. In some embodiments, the prediction of the optimal charging strategy may further be based on one or more past values of the set of prediction parameters (or at least some of them) corresponding to one or more earlier time intervals of the pre-defined length. For example, the pre-defined length defined for the time intervals is 24 hours, the prediction in block 203 may take into account not one or more most recent values of the set of prediction parameters relating to the previous day but also values of the set of prediction parameters relating to the past week.

In some embodiments, special emphasis may be placed in the prediction in block 203 on the particular day of the week (assuming, again, that a time interval of 24 hours is employed). Namely, the prediction in block 203 for a particular day of the week (e.g., a Monday) may take into account at least one or more most recent values of the set of prediction parameters for at least the same day of the week of one or more past weeks (e.g., one or more previous Mondays). Alternatively, a distinction may be made between working days and non-working days as they may typically correspond to significantly different load profiles of the electrical load devices (e.g., electric vehicle chargers). In some embodiments, at least one separate machine-learning algorithm may be provided for each day of the week.

The (predicted) charging strategy may be equally called a charge/discharge operating mode. The charging strategy defines how the energy generation (i.e., charging) and consumption (i.e., discharging) of BESS during the time interval of the pre-defined length is arranged taking into account the expected load profile needed to be handled by the BESS and the current state of charge of said at least one battery of the BESS. For example, the charging strategy may define, what are the optimal periods for charging and/or discharging the BESS, how much charging is needed during the time interval of the pre-defined length, what is the charging power during one or more periods of charging and/or what is the C-rate during one or more periods of discharging. C-rate is defined, in general, as a measure of the rate at which a battery is discharged relative to its maximum capacity.

The prediction of the optimal charging strategy using the one or more trained machine learning algorithms in block 203 may be based on optimizing values of one or more parameters of the BESS (e.g., one or more parameters relating to the state of health of the BESS), that is, the one or more trained machine learning algorithms may have been specifically trained to optimize values of one or more parameters of the BESS. Said one or more parameters may comprise, for example, state of charge (SoC) level (at rest), charging power, the number of battery cycles per time interval of the pre-defined length (e.g., a day), the number of battery cycles before (estimated) end-of-life, the duration of a period of charging, the duration of a period of discharging and/or the times when the charging of the batteries has to take place. One or more upper and/or lower limits (indicative of heathy operation) may be defined for the one or more parameters of the BESS. The one or more trained machine learning algorithms (or at least one of them) may be configured (i.e., may have been trained) to keep values of one or more parameters of the BESS within said one or more upper and/or lower limits. For example, the one or more trained machine learning algorithms (or at least one of them) may be configured (i.e., may have been trained) to keep the SoC level between minimum and maximum allowed SoC levels, keep the number of cycles below a maximum number of cycles per time interval of the pre-defined length (e.g., a day) and/or below maximum number of cycles before end-of-life and/or to ensure that charging and/or discharging is carried out only if a certain minimum charging duration can be exceeded. The one or more trained machine learning algorithms (or specifically at a second trained machine learning algorithm) may have been generated and trained so that the outputted predicted optimal charging strategy is always such that it may be implemented by the battery energy storage system.

In the following, some examples of desired charging behavior are discussed. The one or more trained machine learning algorithms may have been trained specifically to perform the prediction of optimal charging strategy according to one or more of the following examples. Here, it is assumed that the pre-defined length of the time interval is 24 hours and the one or more electrical load devices are electric vehicle chargers. If, at a specific time of the day, the state of charge level of said at least one battery of the BESS is predicted to be close to falling below an allowed lower limit of the state of charge and it is further predicted that there will likely be no cars to be charged at said specific time of the day (or the level of energy stored in BESS will be appropriate to support the electric power supply network), the one or more trained machine learning algorithms may be configured (i.e., trained) to wait for such charging conditions which allow charging of the BESS in a single charging session. Alternatively, a distributed charging session may be employed for charging the BESS little-by-little whenever charging is predicted to be feasible (i.e., charging the BESS whenever the power provided by the electrical grid is larger than the power required by the one or more electric vehicle chargers). Another alternative strategy would be switching the BESS to an offline or energy-saving mode until proper charging conditions are available. The primary goal of the optimal charging strategy may be defined as avoiding over charging of the BESS. For example, if there is no need to charge the BESS to 60% state of charge due to the fact that today only 50% state of charge is needed, charging may be limited to 50%. Additionally or alternatively, a goal of the optimal charging strategy may be to limit the daily number of battery cycles for (further) increasing the lifespan of said at least one battery of the BESS. Finally, the first apparatus operates (or causes operating), in block 204, the battery energy storage system using the predicted charging strategy during said next time interval. After said time interval has lapsed, the process is repeated starting from block 202 for the following time interval of the (same) pre-defined length.

Figure 3:
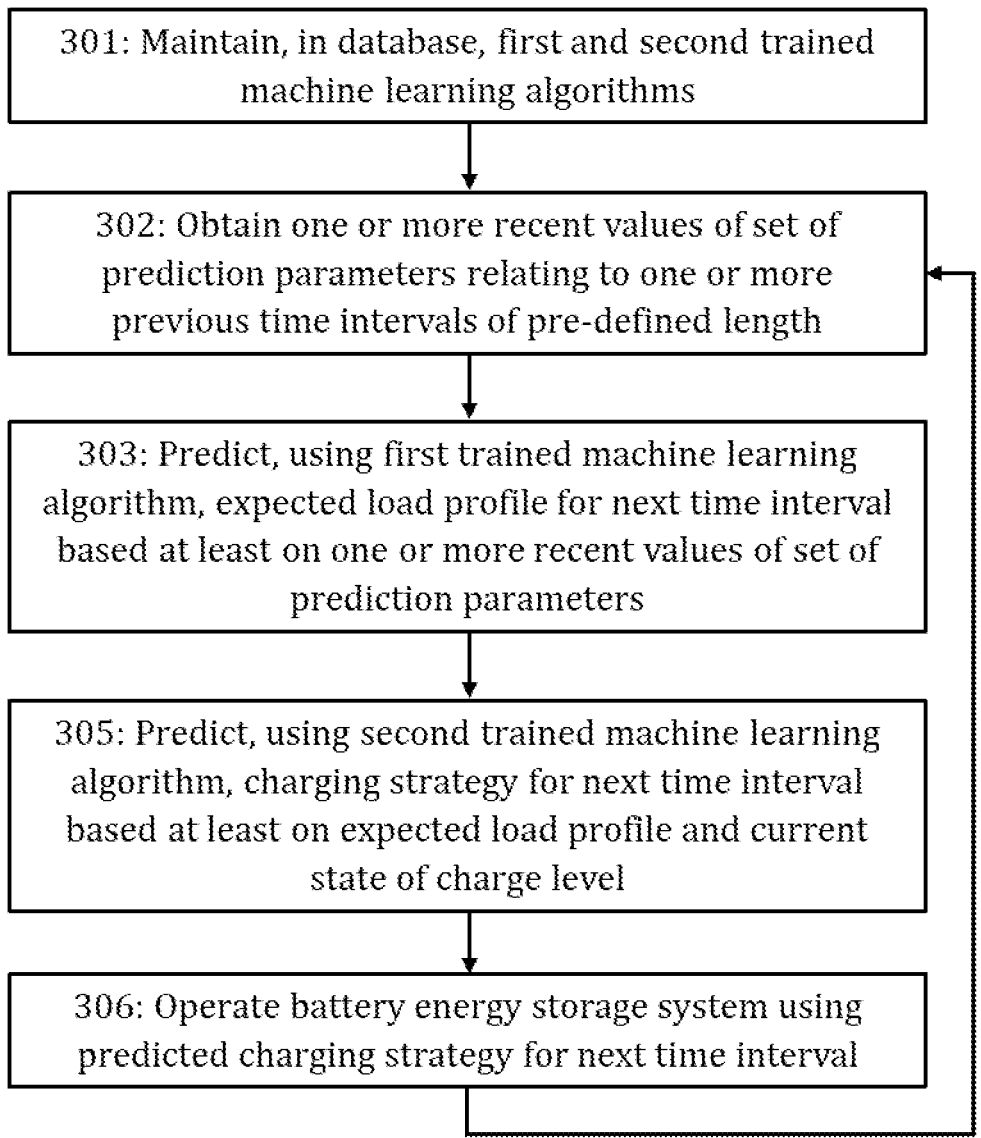

FIG. 3 illustrates another process according to embodiments for predicting an optimal charging strategy for a battery energy storage system and operating the BESS according to the predicted optimal charging strategy. Similar to the process of FIG. 2, the illustrated process may be performed by the BESS itself or by an apparatus (e.g., a computing device) for managing the BESS and being comprised in or electrically connected to the BESS. Specifically, the apparatus carrying out the process may be the BESS 102 of FIG. 1 or an apparatus connected thereto or comprised therein. Also similar to the discussion of FIG. 2, it is assumed that the battery energy storage system is configured to store energy supplied via a point of common coupling of an electric power supply network for use by one or more electrical load devices (e.g., one or more electric vehicle chargers). The electric power may be supplied at least via an electrical grid (e.g., a weak grid) and optionally also by one or more photovoltaic systems. In the following, the apparatus carrying out the process is called simply a first apparatus for brevity. The process of FIG. 3 corresponds to a large extent to the process of FIG. 2. The discussion provided in connection with FIG. 2 applies, mutatis mutandis, also for the process of FIG. 3, unless explicitly stated otherwise.

FIG. 3 illustrates specifically the aforementioned case where the one or more trained machine learning algorithms comprise first and second trained machine learning algorithms. Accordingly, the first apparatus maintains, in block 301, in a first database, a first trained machine learning algorithm for predicting an expected load profile at the point of common coupling defining excess load to be covered by the battery energy storage system (i.e., total load demand at the PCC for the one or more electrical load devices minus the power supplied by the electric power supply network and optionally by one or more PV systems) for the time interval of the pre-defined length based on one or more values of a set of prediction parameters and a second trained machine learning algorithm for predicting the optimal charging strategy based on the expected load profile and a state of charge level of at least one battery of the battery energy storage system. Said one or more values of a set of prediction parameters define features (i.e., input) of the first trained machine learning algorithm while the expected load profile corresponds to a label (i.e., output) of the first trained machine learning algorithm. Furthermore, said expected load profile and the state of charge level of at least one battery of the battery energy storage system define features of the second trained machine learning algorithm while the charging strategy corresponds to a label of the second trained machine learning algorithm. The set of prediction parameters may comprise, also in this embodiment, at least one or more first parameters of the point of common coupling and one or more second parameters of the one or more electrical load devices and optionally one or more third parameters of the one or more photovoltaic systems. Said first, second and third parameters may be further defined as described in connection with FIG. 2.

The first apparatus obtains, in block 302, one or more recent values of a set of prediction parameters relating to one or more previous time intervals of the pre-defined length. The obtaining may be performed as described in connection with block 202 of FIG. 2.

The first apparatus calculates, in block 303, using the first trained machine learning algorithm, an expected load profile at the point of common coupling defining excess load to be covered by the battery energy storage system for the next time interval of the pre-defined length based at least on the one or more recent values of the set of prediction parameters. A load profile may be defined, in general, as the variation of the electrical load (i.e., demand of electric power) over time. Here, the expected load profile may effectively define the amount of energy that needs to be delivered by the battery energy storage system (via the point of common coupling) to the one or more electrical load device during the next time interval of the pre-defined length (e.g., 24 h) to support the operation of the electrical grid (and optionally by one or more PV systems). The expected load profile may correspond to an expected total load profile from which power supplied by the electrical grid (and optionally by one or more PV systems) has been subtracted (assuming also that no load is caused by the battery energy storage system). The expected load profile calculated using the first trained machine learning algorithm may depend (at least implicitly) also one or more (non-changing or rarely changing) properties of the point of common coupling, the BESS, the one or more electrical load devices and/or the one or more photovoltaic systems (if any are available) as said one or more properties may have been taken into account when the first machine learning algorithm was initially generated and/or trained.

The first apparatus predicts, in block 304, using the second trained machine learning algorithm, a charging strategy for said next time interval based at least on a calculated expected load profile (to be covered by the battery energy storage system for said next time interval) and a current state of charge level of at least one battery of the battery energy storage system so as to maximize lifespan of the at least one battery of the battery energy storage system. The charging strategy may be defined as described in connection with block 203 of FIG. 2. In some embodiments, one or more (actual realized) load profiles at the point of common coupling for one or more previous time intervals of the pre-defined length may also be taken into account in the predicting using the second trained machine learning algorithm. Said one or more load profiles may have been derived, e.g., by monitoring the electrical load and/or power supplied by the electrical grid (and optionally by one or more PV systems) at the point of common coupling.

Finally, the first apparatus operates (or causes operating), in block 305, the battery energy storage system using the predicted charging strategy during said next time interval. After said time interval has lapsed, the process is repeated starting from block 302 for the following time interval of the (same) pre-defined length.

In the previous embodiments discussed in connection with FIGS. 2 and 3, it was assumed that the first apparatus merely uses one or more (pre-)trained machine learning algorithms for predicting the optimal charging strategy for the BESS without training said one or more trained machine learning algorithms. However, it would be beneficial for the continued accuracy of the machine learning algorithms (even in changing conditions) if they could be continuously trained during online operation.

Figure 4:
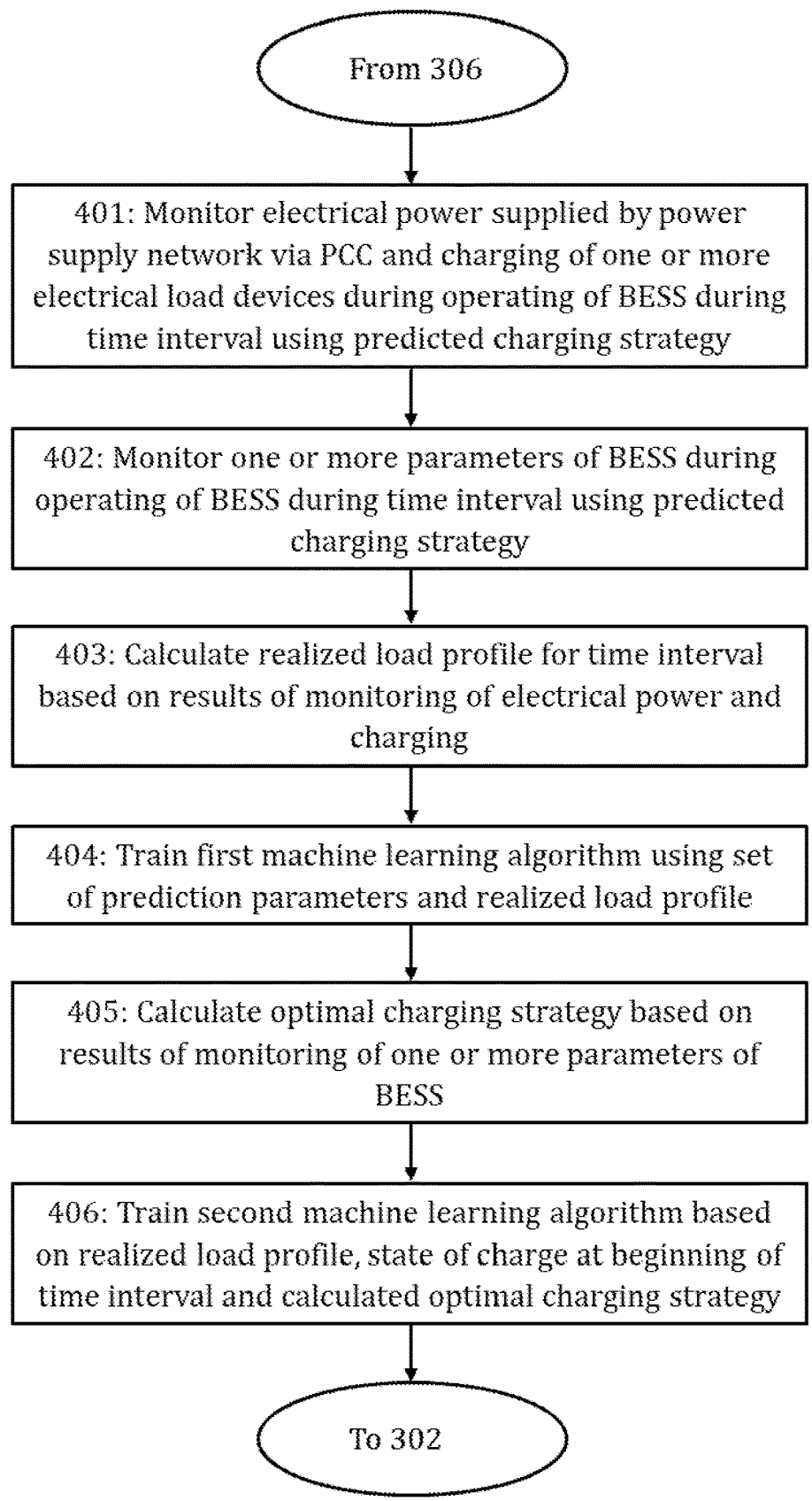

FIG. 4 shows a process according to embodiments for dynamically training the first and second trained machine learning algorithms while performing the prediction of the optimal charging strategy using the first and second trained machine learning algorithms so as to further tune the performance of the first and second trained machine learning algorithms. In other words, it is assumed that the first and second machine learning algorithms have already been trained, for example, before their deployment but further training is carried out during online operation.

The process of FIG. 4 may be initiated during the operating of the battery energy storage system using a predicted charging strategy for a time interval of the pre-defined length in block 306. Namely, during the operating of the battery energy storage system over said time interval using the predicted charging strategy, the first apparatus monitors, in block 401, at least electrical power supplied by the electric power supply network (and optionally one or more PV systems) via the point of common coupling (to the battery energy storage system and/or to one or more electrical load devices) and charging of the one or more electrical load devices (i.e., load profile associated with the one or more electrical load devices). Optionally, the electrical power supplied by the electrical grid and the one or more PV systems may be monitored in block 401 separately. In practice, the monitoring in block 401 may be carried out in communication with the point of common coupling (or specifically a grid connection interface device associated with said at least one point of common coupling) and the one or more electrical load devices. The actual monitoring may be performed by the point of common coupling and the one or more electrical load devices and the results of the monitoring may be transmitted via communications network or link to the first apparatus.

Moreover, the first apparatus monitors, in block 402, one or more parameters of the battery energy storage system during the operating of the battery energy storage system during said time interval using the predicted charging strategy. Said one or more parameters of the battery energy storage system may be defined as described in connection with block 203 of FIG. 2. In some embodiments, said one or more parameters may comprise at least the SoC level.

The first apparatus calculates, in block 403, a load profile at the point of common coupling defining excess load (or excess load demand) to be covered by the battery energy storage system for said (now past) time interval based on results of the monitoring in block 401. Here, the load profile corresponds to the actual realized load profile as opposed to an expected load profile. Alternatively or additionally, the realized load profile may be calculated based on the results of the monitoring in block 402.

The first apparatus trains, in block 404, the first trained machine learning algorithm using the one or more recent values of the set of prediction parameters (used also for prediction in block 302 of FIG. 3) and the (actual realized) load profile as training data. In some embodiments, only a part of said training data may be used for training (namely, a part corresponding to healthy operation of the battery energy storage system).

The first apparatus calculates, in block 405, an optimal charging strategy for said (now past) time interval or a part thereof based on results of the monitoring in block 401 and/or 402. The results of the monitoring of the one or more parameters of the battery energy storage system may correspond to one or more values (e.g., a single value or a time series) defined for each of the one or more parameters. The calculating of the optimal charging strategy may be based on ensuring that the one or more parameters have values which are within desired upper and/or lower limits defined for said one or more parameters (e.g., minimum and maximum allowed state of charge levels). In some embodiments, the calculating of the optimal charging strategy in block 405 may also be based, in part, on the realized load profile. In some embodiments, the optimal charging strategy may be defined simply as the observed charging behavior during one or more sections of the past time interval when the one or more parameters of the battery energy storage system were within the desired (or allowed) upper and/or lower limits (e.g., when the state of charge level was between a minimum allowed state of charge and a maximum allowed state of charge). In other words, only the one or more sections of the past time interval when the one or more parameters had values within a desired range may be used for training.

The first apparatus trains, in block 406, the second trained machine learning algorithm based on the load profile, a state of charge level of the battery energy storage system prior to the time interval of the pre-defined length and the optimal charging strategy as training data. If the optimal charging strategy is defined to encompass only one or more sections of the past time interval of the pre-defined length (that is, one or more sections during which the operation of the battery energy storage system is "healthy"), one or more corresponding sections (in time) of the load profile may be used for the training.

While in the illustrated embodiment of FIG. 4, both the first and second machine learning algorithms were trained, in other embodiments, only one of the first and second machine learning algorithms may be trained dynamically (i.e., online). In other words, in some embodiments blocks 401, 403, 404 (or at least some of them) or blocks 402, 405 (or at least one of them) may be omitted.

Figure 5:
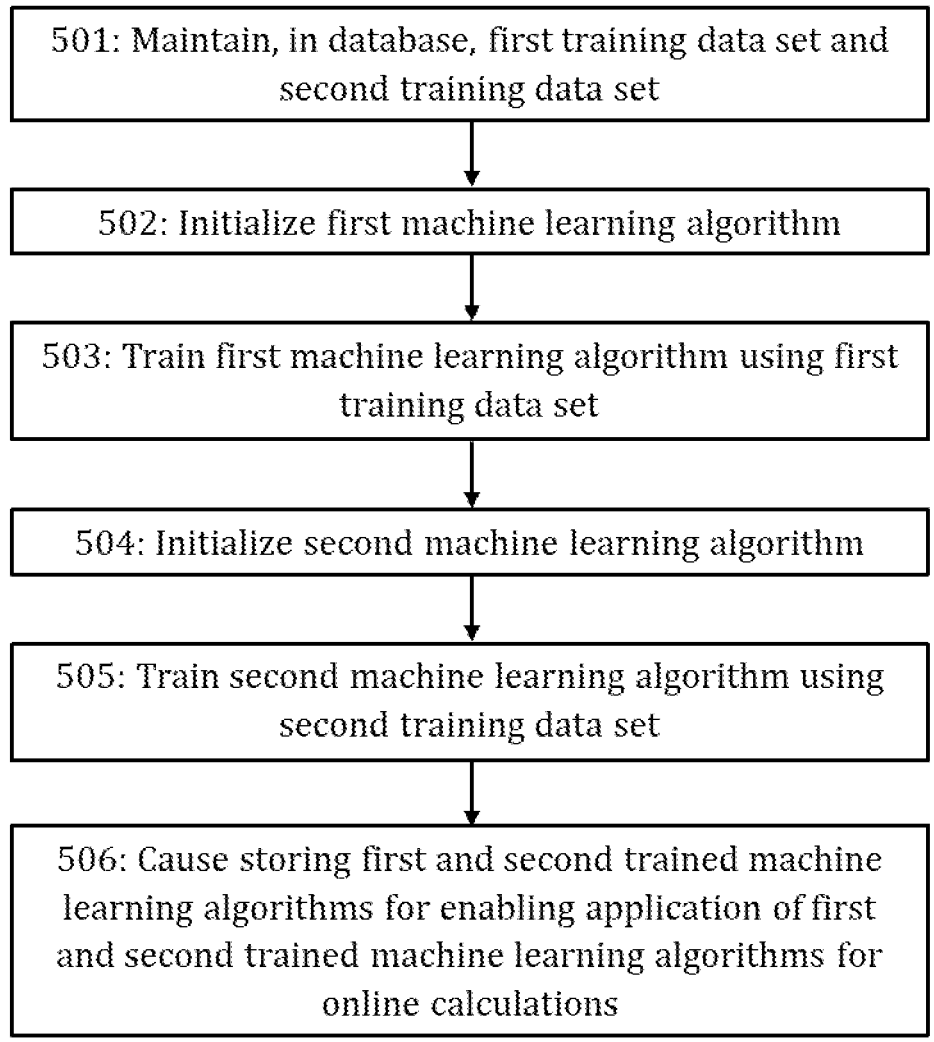

FIG. 5 illustrates a process according to embodiments for generating and training first and second machine learning algorithms (as defined in connection with above embodiments) before they are deployed. Similar to the processes of FIGS. 2 to 4, the illustrated process may be performed by the BESS itself or by an apparatus (e.g., a computing device) for managing the BESS and being comprised in or electrically connected to the BESS. Specifically, the apparatus carrying out the process may be the BESS 102 of FIG. 1 or an apparatus connected thereto or comprised therein. However, in the case of FIG. 5, the illustrated process may be carried out not only by the same apparatus which is also configured to carry out at least one of the processes of FIGS. 2 to 4 but also (i.e., alternatively) by a different apparatus. For example, the process of FIG. 5 may be carried out a physical server computer or a cloud-based server which subsequently transmits the resulting first and second trained machine learning algorithms to the apparatus which is configured to perform the predicting of the expected load profile and/or the optimal charging strategy and possibly further training. In the following, the apparatus carrying out the process of FIG. 5 is called simply a second apparatus (which may or may not be the same apparatus as the first apparatus discussed in connection with FIGS. 2 to 4).

Also similar to the discussion of FIGS. 2 to 4, it is assumed that the battery energy storage system is configured to store energy supplied via a point of common coupling of an electric power supply network for use by one or more electrical load devices (e.g., one or more electric vehicle chargers). The electric power may be supplied at least via an electrical grid (e.g., a weak grid) and optionally also by one or more photovoltaic systems. In the following, the apparatus carrying out the process is called simply an apparatus for brevity.

Referring to FIG. 5, the second apparatus maintains, in block 501, in a second database, a first training data set and a second training data set. The first and second training data set may have been collected, e.g., by monitoring a point of common coupling of an electric power supply network, charging/discharging of a battery energy storage system and (realized) load profiles (and other parameters) of one or more electrical load devices connected to it for a long period of time (e.g., several months). In some embodiments, the first and/or second training data may have been collected from another system having the same or similar composition (i.e., from another system corresponding to the system architecture shown in FIG. 1). In some embodiments, the second database may correspond to the first database.

The first training data set comprises a plurality of values of a set of prediction parameters corresponding to a plurality of time intervals of a pre-defined length and a plurality of load profiles at the point of common coupling of the electric power supply network corresponding to said plurality of time intervals. Each or at least one of the plurality of load profiles may specifically define an excess load (or excess load demand) covered by the battery energy storage system (i.e., which could not be covered by the electric power supply network and/or one or more PV systems). The set of prediction parameters comprise at least one or more first parameters of the point of common coupling and one or more second parameters of one or more electrical load devices connected to the point of common coupling and battery energy storage system. In general, a set of prediction parameters and a load profile may be defined as described in relation to above embodiment.

The second training data set comprises a plurality of load profiles at a point of common coupling of an electric power supply network defining an excess load to be covered by the battery energy storage system, a plurality of state of charge levels of at least one battery of the battery energy storage system and a plurality of optimal charging strategies of the battery energy storage system connected to said point of common coupling and to one or more electrical load devices for said plurality of time intervals. The plurality of load profiles and the plurality of optimal charging strategies may correspond to a plurality of time intervals of a pre-defined length (that is, the same plurality of time intervals) while each of the plurality of state of charge levels may correspond to a state of charge level at a beginning of a given time interval.

The second apparatus initializes, in block 502, a first machine learning algorithm. The first machine learning algorithm may be any machine learning algorithm as discussed above in relation to embodiments. The initialization may comprise generating the first machine learning algorithm and/or setting or selecting initial values for weights, parameters and/or hyperparameters of the first machine learning algorithm (e.g., weights of one or more neural networks). While values of "normal" parameters and weights are trained during the training process (i.e., they change), a hyperparameter is a parameter whose value is set before the learning process begins and which does not change during the learning process. Any known initialization technique may be employed in the initialization.

The initial values defined in the initialization in block 502 may be random values or they may correspond to a predefined set of values known to result in a well-performing algorithm. In some embodiments, the initial values defined in the initialization in block 502 may be defined based on one or more properties of the point of common coupling and/or one or more properties of the one or more electrical load devices. Each set of properties of the point of common coupling and/or the one or more electrical load devices may be mapped in the second database to a set of initial values for the parameters (and/or weights and/or hyperparameters) of the first machine learning algorithm. Said one or more properties may correspond, at least in part, to specifications provided by a manufacturer of a given device.

In some embodiments, the one or more properties of the point of common coupling may comprise one or more properties selected from a group comprising: a maximum allowable voltage limit, a minimum allowable voltage limit and dependency of energy cost on one or more external factors.

In some embodiments, the one or more properties of the one or more electrical load devices may comprise one or more properties selected from a group comprising: a type of the one or more electrical load devices, a number of the one or more electrical load devices, a nominal power of the one or more electrical load devices, an efficiency of the one or more electrical load devices and one or more most common charging profiles of the one or more electrical load devices.

In some embodiments, one or more properties of the one or more photovoltaic systems may also be taken into account in the initialization in block 502. Said one or more properties may comprise, for example, the number of the one or more photovoltaic systems and/or maximum available power provided by said one or more photovoltaic systems.

The second apparatus trains, in block 503, the first machine learning algorithm using the first training data set. In the training, the set of prediction parameters associated with a given time interval of the pre-defined length correspond to features (i.e., input or feature vector or vectors) of the first machine learning algorithm and the plurality of load profiles correspond to a label (i.e., output or label vector) of the first machine learning algorithm. In some embodiments, the features of the first machine learning algorithm may further comprise one or more sets of prediction parameters corresponding to one or more earlier time intervals of the pre-defined length.

Similar to as described for the first machine learning algorithm, the second apparatus initializes, in block 504, a second machine learning algorithm. The second machine learning algorithm may be any machine learning algorithm as discussed above in relation to embodiments. The initialization may comprise generating the second machine learning algorithm and/or setting or selecting initial values for weights, parameters and/or hyperparameters of the second machine learning algorithm (e.g., weights of one or more neural networks). Any known initialization technique may be employed in the initialization.

In some embodiments, the initial values defined in the initialization in block 504 may be defined based on one or more properties of at least one battery of the battery energy storage system. Each set of properties of the battery energy storage system may be mapped in the second database to a set of initial values for the parameters (and/or weights and/or hyperparameters) of the second machine learning algorithm. Said one or more properties may correspond, at least in part, to specifications provided by a manufacturer of the battery energy storage system.

In some embodiments, the one or more properties of at least one battery of the battery energy storage system may comprise one or more properties selected from a group comprising: a type of at least one battery, a charge/discharge procedure of said at least one battery guaranteeing operational conditions (e.g., the recommended C-rate), a maximum number of cycles time interval of the pre-defined length (e.g., a day), a maximum number of cycles before end-of-life, a maximum allowed state of charge level and a minimum allowed state of charge level.

In some embodiments, the second machine learning algorithm may be defined (in block 504) so that the optimal charging strategy outputted by the second machine learning algorithm is limited by one or more upper and/or lower limits defined for one or more parameters of the BESS such as a maximum number of cycles time interval of the pre-defined length (e.g., a day), a maximum number of cycles before end-of-life, a maximum allowed state of charge level, a minimum allowed state of charge level and/or minimum charging duration, as described also in relation to FIG. 2. In other words, the second machine learning algorithm may be defined so that it cannot produce a predicted optimal charging strategy which cannot be implemented by the BESS.

The second apparatus trains, in block 505, the second machine learning algorithm using the second training data set. In the training, a load profile to be covered by the battery energy storage system and a state of charge level of said at least one battery of the battery energy storage system at a beginning of a time interval correspond to features (or specifically feature vectors) of the second machine learning algorithm and an optimal charging strategy corresponds to a label (or specifically a label vector) of the second machine learning algorithm.

Finally, the second apparatus causes storing, in block 506, the first and second trained machine learning algorithms to one or more of said second database and a first database of a first apparatus for enabling applying of the first trained machine learning algorithm for online calculation of an expected load profile at the point of common coupling based at least on one or more recent values of the set of prediction parameters and for enabling applying of the second trained machine learning algorithm for online calculation of an optimal charging strategy for the battery energy storage system based on a current expected load profile (for the next time interval) and a current state of charge level of at least one battery of the battery energy storage system (as described in relation to above embodiments). The causing of the storing may mean here simply storing the information to the first and/or second database (if the second apparatus is maintaining the first and/or second database) or requesting or commanding the first apparatus to store the information to the first database, e.g., by communicating over a communication network or link with the first apparatus maintaining said first database.

In some embodiments, the first and second trained machine learning algorithms may be stored at least to the first database accessible by the first apparatus managing the BESS. Subsequently, the first apparatus may use the first and second trained machine learning algorithms for carrying out any of the embodiments discussed above in relation to FIGS. 2 to 4.

While in the illustrated embodiment of FIG. 5, both the first and second machine learning algorithms were initialized and trained by the second apparatus (i.e., by the same apparatus), in other embodiments, only one of the first and second machine learning algorithms may be initialized and trained by the second apparatus. In other words, in some embodiments blocks 502, 503 and partly blocks 501, 506 (i.e., functions relating to the first machine learning algorithm) or blocks 504, 505 and partly blocks 501, 506 (functions relating to the second machine learning algorithm) may be omitted. In such embodiments, the generating and training of the other machine learning algorithm may be carried out by another device (e.g., by the first apparatus for managing the BESS).

In the following, one exemplary use case of embodiments is discussed in detail. The use case relates to an EVC site installed in a weak grid which may be considered a typical application of some embodiments.

The example may correspond to the system of FIG. 1 without the one or more PV systems 101. Maximum power of the electrical grid may be limited by operator to a pre-defined value (e.g., 200 kW). However, rated power of one EVC (2×175 kW power cabinet) may be 350 kW. The site may be composed of six individual charging posts. This reflects how important the optimal selection of BESS capacity size is, which has a direct impact on lifespan of the batteries. Simple mathematical formulas or control strategies are not feasible options for analysis of such phenomena, due to the fact that the number and nature of the charging sessions is not so simple to predict for the following reasons:

Charging power is changing during charging session (operation with maximum power is for limited time only, i.e., charging a Porsche Taycan from 10% to 80% takes 22.5 minutes. However, maximum charging power in that case is 255 kW only for approximately 10 minutes.

Charging power is dependent on ambient temperature and initial SoC level of cars.

Charging behavior in urban, rural or motorway areas is completely different.

Selecting BESS size based on simple energy balance (i.e., subtracting the maximum grid power from maximum power required by the EVCs) leads to strong oversizing the BESS, and not guaranteed lifetime protection by a control circuit. Hence, the embodiments provide a solution which provides backup option of battery protection thanks to the additional features such as BESS-to-EVCs communication functionalities.

When life-time factor of one or more batteries of the BESS is exceeded, selective limitation of cars charging power based on SoC levels of the cars may be carried out, for example, according to the following scheme:

SoC<30%: car should be charged,
30%≤SoC≤80%: reduce charging power and
SoC>80%: stop charging and wait.

In general, these three conditions may be written as SoC<A, A≤SoC≤B and SoC>B, where A and B are certain pre-defined SoC levels (e.g., 30% and 80%, respectively).

The blocks, related functions, and information exchanges described above by means of FIGS. 2 to 5 in no absolute chronological order, and some of them may be performed simultaneously or in an order differing from the given one. Other functions can also be executed between them or within them, and other information may be sent and/or received. Some of the blocks or part of the blocks or one or more pieces of information can also be left out or replaced by a corresponding block or part of the block or one or more pieces of information.

Figure 6:
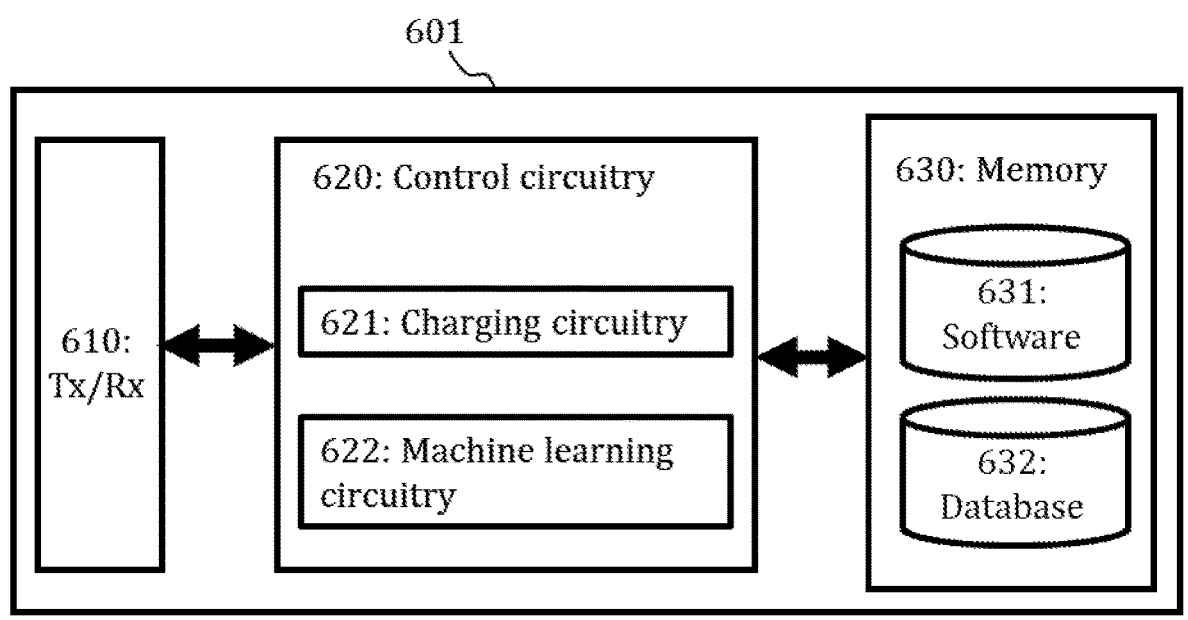
FIG. 6 illustrates an apparatus according to embodiments.

FIG. 6 provides an apparatus 601 according to some embodiments. FIG. 6 may illustrate an apparatus configured to carry out at least the functions described above in connection with predicting charging strategies for battery energy storage systems using machine learning. The apparatus may be comprised in or electrically connected to a battery energy storage system. The apparatus 601 may comprise one or more communication control circuitry 620, such as at least one processor, and at least one memory 630, including one or more algorithms 631, such as a computer program code (software) wherein the at least one memory and the computer program code (software) are configured, with the at least one processor, to cause, respectively, the apparatus 601 to carry out any one of the exemplified functionalities of the first apparatus and/or the second apparatus described above.

Referring to FIG. 6, the control circuitry 620 of the apparatus may comprise charging circuitry 621. The charging circuitry 621 may be configured to predict an optimal charging strategy and implement said predicted optimal charging strategy. To that end, charging circuitry 621 may be configured to carry out at least some of the functionalities described above by means of any of FIGS. 2 and/or 3 using one or more individual circuitries. Additionally or alternatively, the control circuitry 620 of the apparatus 601 may comprise machine learning circuitry 622 which may be configured to carry out at least some of the machine learning—related functionalities (or specifically, the machine learning algorithm generation and training functionalities and/or subsequent online training functionalities) according to embodiments and, to this end, to carry out at least some of the functionalities described above by means of any of elements of FIGS. 4 and/or 5 using one or more individual circuitries.

The memory 630 may comprise a database 632 which may comprise, for example, one or more (trained) machine learning algorithms such as the first (trained) machine learning algorithm and a second (trained) machine learning algorithm, one or more data sets comprising current and/or historic values of prediction parameters, one or more first and/or second training data sets and/or one or more data sets comprising information (e.g., properties of the one or more electrical load devices and/or the BESS) used in generating machine learning algorithm(s), as described in previous embodiments. The memory 630 may also comprise other databases which may not be related to the functionalities of the network node according to any of presented embodiments. The memory 630 may be implemented using any suitable data storage technology, such as semiconductor-based memory devices, flash memory, magnetic memory devices and systems, optical memory devices and systems, fixed memory and removable memory.

Referring to FIG. 6, the apparatus may further comprise different interfaces 610 such as one or more communication interfaces (TX/RX) comprising hardware and/or software for realizing communication connectivity over the medium according to one or more communication protocols. Specifically, the communication interface 610 may provide the apparatus with communication capabilities to communicate in a wireless or wired communication system. If the apparatus 601 corresponds to the first apparatus as described above, the communication interface 610 may enable communication with at least one battery energy storage system, at least one point of common coupling (or a grid connection interface device associated with said at least one point of common coupling), one or more electrical load devices (e.g., electric vehicle chargers) and/or one or more photovoltaic systems. If the apparatus 601 corresponds to the second apparatus as described above, the communication interface 610 may enable communication with a first apparatus for managing a BESS.

The interfaces 610 may comprise standard well-known components such as an amplifier, filter, frequency-converter, (de)modulator, and encoder/decoder circuitries, controlled by the corresponding controlling units, and one or more antennas. The apparatus may possibly also comprise at least one user interface.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In embodiments, the at least one processor, the memory, and the computer program code form processing means or comprises one or more computer program code portions for carrying out one or more operations according to any one of the embodiments of FIGS. 2 to 5 or operations thereof.

In an embodiment, at least some of the processes described in connection with FIGS. 2 to 5 may be carried out by an apparatus comprising corresponding means for carrying out at least some of the described processes. For example, these processes may be implemented in hardware (one or more devices), firmware (one or more devices), software (one or more modules), or combinations thereof. Some exemplary hardware means for carrying out the processes may include at least one of the following: detector, processor (including dual-core and multiple-core processors), microprocessor, controller, micro-controller, receiver, transmitter, encoder, decoder, memory, RAM, ROM, display, user interface, display circuitry, user interface circuitry, user interface software, display software, circuit, antenna, antenna circuitry, an application-specific integrated circuit (ASIC), a digital signal processor (DSP), a digital signal processing device (DSPD), a programmable logic device (PLD), a field programmable gate array (FPGA), and circuitry. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. In an embodiment, the at least one processor, the memory, and the computer program code form processing means or comprises one or more computer program code portions for carrying out one or more operations according to any one of the embodiments of FIGS. 2 to 5 or operations thereof.

Embodiments as described may also be carried out in the form of a computer process defined by a computer program or portions thereof. Embodiments of the methods described in connection with FIGS. 2 to 5 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A first apparatus for managing a battery energy storage system for storing energy supplied via a point of common coupling of an electric power supply network for use by one or more electrical load devices, the first apparatus comprising:
   at least one processor, and
   at least one memory for storing instructions to be executed by the processor, wherein the at least one memory and the instructions are configured to, with the at least one processor, cause the first apparatus at least to perform:
   maintaining, in a first database, one or more trained machine learning algorithms for predicting an optimal charging strategy for a time interval of a pre-defined length based at least on one or more values of a set of prediction parameters and a state of charge level of at least one battery of the battery energy storage system, wherein the set of prediction parameters include at least one or more first parameters of the point of common coupling and one or more second parameters of the one or more electrical load devices, wherein the one or more trained machine learning algorithms comprise a first trained machine learning algorithm for predicting an expected load profile at the point of common coupling defining excess load to be covered by the battery energy storage system for the time interval of the pre-defined length based on the one or more values of the set of prediction parameters and a second trained machine learning algorithm for predicting the optimal charging strategy based on the expected load profile and a current state of charge level of said at least one battery of the battery energy storage system;

obtaining one or more recent values of the set of prediction parameters relating to one or more previous time intervals of the pre-defined length;

predicting, using the one or more trained machine learning algorithms, an optimal charging strategy for maximizing lifespan of said at least one battery of the battery energy storage system for a next time interval of the pre-defined length based at least on the one or more recent values of the set of prediction parameters and the current state of charge level of said at least one battery of the battery energy storage system, wherein the predicting using the one or more trained machine learning algorithms is performed by calculating, using the first trained machine learning algorithm, an expected load profile at the point of common coupling defining excess load to be covered by the battery energy storage system for the next time interval of the pre-defined length based at least one the one or more recent values of the set of prediction parameters, and predicting, using the second trained machine learning algorithm, the charging strategy for said next time interval based on a calculated expected load profile and the current state of charge level of said at least one battery of the battery energy storage system for maximizing lifespan of said at least one battery of the battery energy storage system; and operating the battery energy storage system using the predicted optimal charging strategy during said next time interval, wherein the at least one memory and the instructions are configured to, with the at least one processor, cause the first apparatus to perform, monitoring electrical power supplied by the power supply network via the point of common coupling and charging of the one or more electrical load devices during the operating of the battery energy storage system during said next time interval using the predictive charging strategy;

calculating a realized load profile at the point of common coupling defining excess load covered by the battery energy storage system for a time interval of the pre-defined length based on results of the monitoring of the electrical power supplied by the power network via the point of common coupling and the charging of the one or more electrical load devices; and training the first trained machine learning algorithm using the one or more recent values of the set of prediction parameters and the realized load profile as training data.

2. The first apparatus according to claim 1, wherein the one or more values of the set of prediction parameters correspond, for at least one of the set of parameters, to a plurality of values defining a time series over at least one of the one or more previous time intervals of the pre-defined length.

3. The first apparatus according to claim 1, wherein the one or more previous time intervals comprise a most recent time interval of the pre-defined length directly preceding said next time interval and/or one or more-time intervals of the pre-defined length preceding said most recent time interval.

4. The first apparatus according to claim 1, wherein the one or more first parameters of the point of common coupling include one or more electric parameters associated with power transfer to the battery energy storage system and/or to the one or more electrical load devices selected from a group including: voltage, current, frequency, power, active power, reactive power, maximum available power, peak power and energy.

5. The first apparatus according to claim 1, wherein the one or more second parameters of the one or more electrical load devices include, for each of the one or more electrical load devices, at least load demand.

6. The first apparatus according to claim 1, wherein the one or more electrical load devices comprise one or more electric vehicle chargers and the one or more second parameters of the one or more electric vehicle chargers include one or more parameters selected from a group of:

a type or model of a car charged by the one or more electric vehicle chargers or a distribution thereof covering a time interval of the pre-defined length, an initial and final state of charge level of a car charged by the one or more electric vehicle chargers or distributions thereof covering a time interval of the pre-defined length, energy transferred to cars, by the one or more electric vehicle chargers, over a time interval of the pre-defined length, charging power of the one or more electric vehicle chargers over the time interval of the pre-defined length and energy transferred from the BESS to the one or more electric vehicle chargers over the time interval of the pre-defined length.

7. The first apparatus according to claim 1, wherein the set of prediction parameters further comprise one or more third parameters of one or more photovoltaic systems connected to the point of common coupling and configured to supply power to the battery energy storage system and the one or more electrical load devices.

8. The first apparatus according to claim 7, wherein the one or more third parameters of the one or more photovoltaic systems include, for each of the one or more photovoltaic systems, one or more parameters selected from a group including: maximum available power and past energy generation during a past time interval of the pre-defined length and expected future energy generation during a future time interval of the pre-defined length.

9. The first apparatus according to claim 1, wherein the optimal charging strategy for the time interval of the pre-defined length predicted using the one or more machine-learning algorithms defines one or more of the following:

one or more optimal periods for charging said at least one battery of the battery energy storage system;

one or more optimal periods for discharging said at least one battery of the battery energy storage system;

overall charging needed during said next time interval of the pre-defined length;

a charging power during one or more optimal periods of charging; and a C-rate during one or more optimal periods of discharging.

10. The first apparatus according to claim 1, wherein the at least one memory and the instructions are configured to, with the at least one processor, cause the first apparatus to perform:

monitoring one or more parameters of the battery energy storage system during the operating of the battery energy storage system during said next time interval using the predicted charging strategy, wherein the one or more parameters comprise at least a state of charge level;

calculating an optimal charging strategy for the time interval of the pre-defined length or a part thereof based on results of the monitoring of the one or more parameters of the battery energy storage system and the realized load profile during that time interval; and training the second trained machine learning algorithm using the realized load profile, a state of charge level of the battery energy storage system prior to the time interval of the pre-defined length and the calculated optimal charging strategy as training data.

11. The first apparatus according to claim 1, wherein the time interval of the pre-defined length has a length selected from a range of 1-48 hours.

12. The first apparatus according to claim 1, wherein the one or more electric load devices comprise one or more electric vehicle chargers.

13. The first apparatus according to claim 1, wherein each of the one or more machine learning algorithms is based on statistical classification, regression analysis, reinforcement learning, multi-agent learning, decision tree-based learning or a combination thereof.

14. A second apparatus comprising:
at least one processor, and
at least one memory for storing instructions to be executed by the processor, wherein the at least one memory and the instructions are configured to, with the at least one processor, cause the second apparatus at least to perform:
maintaining, in a second database, a first training data set including a plurality of values of a set of prediction parameters corresponding to a plurality of time intervals of a pre-defined length and a plurality of load profiles at a point of common coupling of an electric power supply network defining excess load to be covered by a battery energy storage system corresponding to said plurality of time intervals, wherein the set of prediction parameters include at least one or more first parameters of the point of common coupling and one or more second parameters of one or more electrical load devices connected to the point of common coupling and the battery energy storage system;
initializing a first machine learning algorithm;
training the first machine learning algorithm using the first training data set, wherein the set of prediction parameters correspond to features of the first machine learning algorithm and the plurality of load profiles correspond to a label of the first machine learning algorithm;
causing storing the first trained machine learning algorithm to one or more of said second database and a first database of a first apparatus for enabling applying of the first trained machine learning algorithm for online calculation of an expected load profile at the point of common coupling based at least on one or more recent values of the set of prediction parameters;
maintaining, in the second database, a second training data set including the plurality of load profiles, a plurality of state of charge levels of at least one battery of the battery energy storage system, and a plurality of optimal charging strategies of the battery energy storage system connected to said point of common coupling and to one or more electrical load devices for said plurality of time intervals corresponding to the plurality of time intervals of the pre-defined length;
initializing a second machine learning algorithm;
training the second machine learning algorithm using the second training data set, wherein a load profile and a state of charge level of said at least one battery of the battery energy storage system correspond to features of the second machine learning algorithm and an optimal charging strategy corresponds to a label of the second machine learning algorithm; and
causing storing the second trained machines learning algorithm to one or more of said second database and the first database for enabling applying of the trained second machine learning algorithm for online calculation of an optimal charging strategy for the battery energy storage system based on an expected load profile for a next time interval and a current state of charge level of at least one battery of the battery energy storage system.

15. The second apparatus according to claim 14, wherein the at least one memory and the instructions are configured to, with the at least one processor, cause the second apparatus to perform:
maintaining, in the second database, one or more trained machine learning algorithms for predicting an optimal charging strategy for a time interval of a pre-defined length based at least on one or more values of a set of prediction parameters and a state of charge level of at least one battery of the battery energy storage system, wherein the one or more trained machine learning algorithms comprise the first and second trained machine learning algorithms, the set of prediction parameters comprise at least one or more first parameters of the point of common coupling and one or more second parameters of the one or more electrical load devices;
obtaining one or more recent values of the set of prediction parameters relating to one or more previous time intervals of the pre-defined length;
predicting, using the one or more trained machine learning algorithms, an optimal charging strategy for maximizing lifespan of said at least one battery of the battery energy storage system for a next time interval of the pre-defined length based at least on the one or more recent values of the set of prediction parameters and a current state of charge level of said at least one battery of the battery energy storage system; and
operating the battery energy storage system using the predicted optimal charging strategy during said next time interval.

16. A second apparatus comprising:
at least one processor, and
at least one memory for storing instructions to be executed by the processor, wherein the at least one memory and the instructions are configured to, with the at least one processor, cause the second apparatus at least to perform:
maintaining, in a second database, a second training data set comprising a plurality of load profiles at a point of common coupling of an electric power supply network defining excess load to be covered by a battery energy storage system, a plurality of state of charge levels of at least one battery of the battery energy storage system and a plurality of optimal charging strategies of the battery energy storage system connected to said point of common coupling and to one or more electrical load devices for said plurality of time intervals, wherein the plurality of load profiles and the plurality of optimal charging strategies correspond to a plurality of time intervals of a pre-defined length;
initializing a second machine learning algorithm;
training the second machine learning algorithm using the second training data set, wherein a load profile and a state of charge level of said at least one battery of the battery energy storage system corresponds to features of the second machine learning algorithm and an optimal charging strategy correspond to a label of the second machine learning algorithm; and causing storing the second trained machine learning algorithm to one or more of said second database and a first database of a first apparatus for enabling applying of the trained second machine learning algorithm for online calculation of an optimal charging strategy for the battery energy storage system based on an expected load profile for a next time interval and a current state of charge level of at least one battery of the battery energy storage system.

17. A method for managing a battery energy storage system for storing energy supplied via a point of common coupling of an electric power supply network for use by one or more electrical load devices, the method comprising:

maintaining, in a first database, one or more trained machine learning algorithms for predicting an optimal charging strategy for a time interval of a pre-defined length based at least on one or more values of a set of prediction parameters and a state of charge level of at least one battery of the battery energy storage system, wherein the set of prediction parameters comprise at least one or more first parameters of the point of common coupling and one or more second parameters of the one or more electrical load devices, wherein the one or more trained machine learning algorithms comprise a first trained machine learning algorithm for predicting an expected load profile at the point of common coupling defining excess load to be covered by the battery energy storage system for the time interval of the pre-defined length based on the one or more values of the set of prediction parameters and a second trained machine learning algorithm for predicting the optimal charging strategy based on the expected load profile and a current state of charge level of said at least one battery of the battery energy storage system;

obtaining one or more recent values of the set of prediction parameters relating to one or more previous time intervals of the pre-defined length;

predicting, using the one or more trained machine learning algorithm, an optimal charging strategy for maximizing lifespan of said at least one battery of the battery energy storage system for a next time interval of the pre-defined length based at least on the one or more recent values of the set of prediction parameters and a current state of charge level of said at least one battery of the battery energy storage system, wherein the predicting using the one or more trained machine learning algorithms is performed by calculating, using the first trained machine learning algorithm, an expected load profile at the point of common coupling defining excess load to be covered by the battery energy storage system for the next time interval of the pre-defined length based at least one the one or more recent values of the set of prediction parameters, and predicting, using the second trained machine learning algorithm, the charging strategy for said next time interval based on a calculated expected load profile and the current state of charge level of said at least one battery of the battery energy storage system for maximizing lifespan of said at least one battery of the battery energy storage system; and operating the battery energy storage system using the predicted optimal charging strategy during said next time interval, wherein the method comprises:

monitoring electrical power supplied by the power supply network via the point of common coupling and charging of the one or more electrical load devices during the operating of the battery energy storage system during said next time interval using the predictive charging strategy;

calculating a realized load profile at the point of common coupling defining excess load covered by the battery energy storage system for a time interval of the pre-defined length based on results of the monitoring of the electrical power supplied by the power network via the point of common coupling and the charging of the one or more electrical load devices; and training the first trained machine learning algorithm using the one or more recent values of the set of prediction parameters and the realized load profile as training data.

18. A computer program stored on a non-transitory computer readable medium, the computer program comprising instructions for performing at least the following:

obtaining one or more recent values of a set of prediction parameters relating to one or more previous time intervals of a pre-defined length, wherein the set of prediction parameters comprise at least one or more first parameters of a point of common coupling and one or more second parameters of one or more electrical load devices, the point of common coupling being connected to a battery energy storage system, an electric power supply network and the one or more electrical load devices;

predicting, using one or more trained machine learning algorithms, an optimal charging strategy for maximizing lifespan of said at least one battery of the battery energy storage system for a next time interval of the pre-defined length based at least on the one or more recent values of the set of prediction parameters and a current state of charge level of said at least one battery of the battery energy storage system, wherein the one ore more trained machine learning algorithms comprise a first trained machine learning algorithm for predicting an expected load profile at the point of common coupling defining excess load to be covered by the battery energy storage system for the time interval of the pre-defined length based on the one or more values of the set of prediction parameters and a second trained machine learning algorithm for predicting the optimal charging strategy based on the expected load profile and the current state of charge level of said at least one battery of the battery energy storage system, and wherein the predicting using the one or more trained machine learning algorithms is preformed by calculating, using the first trained machine learning algorithm, an expected load profile at the point of common coupling defining excess load to be covered by the battery energy storage system for the next time interval of the pre-defined length based at least on the one or more recent values of the set of prediction parameters, and predicting, using the second trained machine learning algorithm, the charging strategy for said next time interval based on a calculated expected load profile and the current state of charge level of said at least one battery of the battery energy storage system for maximizing lifespan of said at least one battery of the battery energy storage system;

operating the battery energy storage system using the predicted optimal charging strategy during said next time interval;

monitoring electrical power supplied by the power supply network via the point of common coupling and charging of the one or more electrical load devices during the operating of the battery energy storage system during said next time interval using the predictive charging strategy;

calculating a realized load profile at the point of common coupling defining excess load covered by the battery energy storage system for a time interval of the pre-defined length based on results of the monitoring of the electrical power supplied by the power network via the point of common coupling and the charging of the one or more electrical load devices; and training the first trained machine learning algorithm using the one or more recent values of the set of prediction parameters and the realized load profile as training data.

19. A method comprising:

maintaining, in a second database, a first training data set comprising a plurality of values of a set of prediction parameters corresponding to a plurality of time intervals of a pre-defined length and a plurality of load profiles at a point of common coupling of an electric power supply network defining excess load to be covered by a battery energy storage system corresponding to said plurality of time intervals, wherein the set of prediction parameters comprise at least one or more first parameters of the point of common coupling and one or more second parameters of one or more electrical load devices connected to the point of common coupling and the battery energy storage system;

initializing a first machine learning algorithm;

training the first machine learning algorithm using the first training data set, wherein the set of prediction parameters correspond to features of the first machine learning algorithm and the plurality of load profiles correspond to a label of the first machine learning algorithm;

causing storing the first trained machine learning algorithm to one or more of said second database and a first database of a first apparatus for enabling applying of the first trained machine learning algorithm for online calculation of an expected load profile at the point of common coupling based at least on one or more recent values of the set of prediction parameters;

maintaining, in the second database, a second training data set including the plurality of load profiles, a plurality of state of charge levels of at least one battery of the battery energy storage system, and a plurality of optimal charging strategies of the battery energy storage system connected to said point of common coupling and to one or more electrical load devices for said plurality of time intervals corresponding to the plurality of time intervals of the pre-defined length;

initializing a second machine learning algorithm;

training the second machine learning algorithm using the second training data set, wherein a load profile and a state of charge level of said at least one battery of the battery energy storage system correspond to features of the second machine learning algorithm and an optimal charging strategy corresponds to a label of the second machine learning algorithm; and causing storing the second trained machines learning algorithm to one or more of said second database and the first database for enabling applying of the trained second machine learning algorithm for online calculation of an optimal charging strategy for the battery energy storage system based on an expected load profile for a next time interval and a current state of charge level of at least one battery of the battery energy storage system.

20. A computer program stored on a non-transitory computer readable medium, the computer program comprising instructions for performing at least the following:

initializing a first machine learning algorithm;

training the first machine learning algorithm using a first training data set comprising a plurality of values of a set of prediction parameters corresponding to a plurality of time intervals of a pre-defined length and a plurality of load profiles at a point of common coupling of an electric power supply network defining excess load to be covered by a battery energy storage system corresponding to said plurality of time intervals, wherein the set of prediction parameters comprise at least one or more first parameters of the point of common coupling and one or more second parameters of one or more electrical load devices connected to the point of common coupling and the battery energy storage system and the set of prediction parameters correspond to features of the first machine learning algorithm and the plurality of load profiles correspond to a label of the first machine learning algorithm; and causing storing the first trained machine learning algorithm to one or more of said second database and a first database of a first apparatus for enabling applying of the first trained machine learning algorithm for online calculation of an expected load profile at the point of common coupling based at least on one or more recent values of the set of prediction parameters;

initializing a second machine learning algorithm;

training the second machine learning algorithm using a second training data set comprising the plurality of load profiles, a plurality of state of charge levels of at least one battery of the battery energy storage system, and a plurality of optimal charging strategies of the battery energy storage system connected to said point of common coupling and to one or more electrical load devices for said plurality of time intervals corresponding to the plurality of time interval of the pre-defined length, wherein a load profile and a state of charge level of said at least one battery of the battery energy storage system correspond to features of the second machine learning algorithm and an optimal charging strategy corresponds to a label of the second machine learning algorithm; and causing storing the second trained machine learning algorithm to one or more of said second database and the first database for enabling applying of the trained second machine learning algorithm for online calculation of an optimal charging strategy for the battery energy storage system based on an expected load profile for a next time interval and a current state of charge level of at least one battery of the battery energy storage system.

21. A method comprising:

maintaining, in a second database, a second training data set comprising a plurality of load profiles at a point of common coupling of an electric power supply network defining excess loads to be covered by a battery energy storage system, a plurality of state of charge levels of at least one battery of the battery energy storage system and a plurality of optimal charging strategies of the battery energy storage system connected to said point of common coupling and to one or more electrical load devices, wherein the plurality of load profiles, the plurality of state of charge levels and the plurality of optimal charging strategies correspond to a plurality of time intervals of a pre-defined length;

initializing a second machine learning algorithm;

training the second machine learning algorithm using the second training data set, wherein a load profile and a state of charge level of said at least one battery of the battery energy storage system corresponds to features of the second machine learning algorithm and an optimal charging strategy correspond to a label of the second machine learning algorithm; and causing storing the second trained machine learning algorithm to one or more of said second database and a first database of a first apparatus for enabling applying of the trained second machine learning algorithm for online calculation of an optimal charging strategy for the battery energy storage system based on a expected load profile for a next time interval and a current state of charge level of at least one battery of the battery energy storage system.

22. A computer program stored on a non-transitory computer readable medium, the computer program comprising instructions for performing at least the following:

initializing a second machine learning algorithm;

training the second machine learning algorithm using a second training data set comprising a plurality of load profiles at a point of common coupling of an electric power supply network defining excess loads to be covered by a battery energy storage system, a plurality of state of charge levels of at least one battery of the battery energy storage system and a plurality of optimal charging strategies of the battery energy storage system connected to said point of common coupling and to one or more electrical load devices, wherein the plurality of load profiles, the plurality of state of charge levels and the plurality of optimal charging strategies correspond to a plurality of time intervals of a pre-defined length;

causing storing the second trained machine learning algorithm to one or more of said second database and a first database of a first apparatus for enabling applying of the trained second machine learning algorithm for online calculation of an optimal charging strategy for the battery energy storage system based on an expected load profile for a next time interval and a current state of charge level of at least one battery of the battery energy storage system.

* * * * *